US010262076B2

(12) United States Patent
Chang et al.

(10) Patent No.: US 10,262,076 B2
(45) Date of Patent: Apr. 16, 2019

(54) LEVERAGING STRUCTURED XML INDEX DATA FOR EVALUATING DATABASE QUERIES

(71) Applicant: Oracle International Corporation, Redwood Shores, CA (US)

(72) Inventors: Hui Joe Chang, San Jose, CA (US); Thomas Baby, Maple Valley, WA (US); Zhen Hua Liu, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 153 days.

(21) Appl. No.: 14/513,176

(22) Filed: Oct. 13, 2014

(65) Prior Publication Data

US 2015/0039642 A1 Feb. 5, 2015

Related U.S. Application Data

(62) Division of application No. 12/580,923, filed on Oct. 16, 2009, now Pat. No. 8,880,506.

(51) Int. Cl.
*G06F 17/30* (2006.01)

(52) U.S. Cl.
CPC .. *G06F 17/30932* (2013.01); *G06F 17/30935* (2013.01)

(58) Field of Classification Search
CPC ............ G06F 17/30448; G06F 17/30935
See application file for complete search history.

(56) References Cited

U.S. PATENT DOCUMENTS

| 6,513,034 | B1* | 1/2003 | Leung ............... G06F 17/30321 |
| 7,120,645 | B2 | 10/2006 | Manikutty et al. |
| 7,644,066 | B2 | 1/2010 | Krishnaprasad et al. |
| 2003/0140308 | A1* | 7/2003 | Murthy ............ G06F 17/30917 715/234 |
| 2005/0097084 | A1 | 5/2005 | Balmin et al. |

(Continued)

OTHER PUBLICATIONS

Krishnaprasad et al., Query Rewrite for XML in Oracle XML DB, Proceedings of the 30th VLDB Conference, Toronto, Canada, 2004.*

(Continued)

*Primary Examiner* — Brittany N Allen
(74) *Attorney, Agent, or Firm* — Hickman Palermo Becker Bingham LLP

(57) ABSTRACT

A query may be rewritten to leverage information stored in a structured XML index. An operator in the query may be analyzed to determine an input source database object for the operator by traversing an operator tree rooted at the operator. The path expressions associated with the operator tree may be fused together to form an effective path expression for the operator. If the effective path expression directly matches a path expression derived from the index, the query may be rewritten using references to the index. Operators in a query that have effective paths that refer to data in the same index table may be grouped together. A single subquery may be written for a group of operators. Also, a structured XML index may be used as an implied schema for indexed XML data. This implied schema may be used to optimize queries that refer to the indexed XML data.

10 Claims, 9 Drawing Sheets

(56) References Cited

U.S. PATENT DOCUMENTS

| | | | |
|---|---|---|---|
| 2005/0210023 A1* | 9/2005 | Barrera | G06F 17/30454 |
| 2006/0031233 A1* | 2/2006 | Liu | G06F 17/2247 |
| 2006/0230016 A1* | 10/2006 | Cunningham | G06F 17/30463 |
| 2007/0239681 A1* | 10/2007 | Krishnaprasad et al. | 707/3 |
| 2007/0299834 A1* | 12/2007 | Liu et al. | 707/4 |
| 2008/0120321 A1 | 5/2008 | Liu et al. | |
| 2009/0259641 A1 | 10/2009 | Balmin et al. | |
| 2009/0319487 A1* | 12/2009 | Carlin | G06F 17/30604 |
| 2010/0030727 A1* | 2/2010 | Chandrasekar | G06F 17/30911 707/715 |

OTHER PUBLICATIONS

Liu et al., XMLTable Index—An Efficient Way of Indexing and Querying XML Property Data, 2007, IEEE (Year: 2007).*
Murthy et al., Towards an Enterprise XML Architecture, SIGMOD 2005, Jun. 14-16, 2005 (Year: 2005).*
Liu et al., Towards a Physical XML independent XQuery/SQL/XML engine, PVLDB '08, Aug. 23-28, 2008 (Year: 2008).*
Pal et al., Indexing XML Data Stored in a Relational Database, Microsoft Corporation, 30th VLDB Conference, 2004 (Year: 2004).*
Baras et al., Optimizing Similar Scalar Subqueries for XML Processing in Microsoft SQL Server, 2007 IEEE (Year: 2007).*
U.S. Appl. No. 12/580,923, filed Oct. 16, 2009, Office Action, dated Feb. 13, 2012.
U.S. Appl. No. 12/580,923, filed Oct. 16, 2009, Advisory Action, dated Oct. 18, 2012.
U.S. Appl. No. 12/580,923, filed Oct. 16, 2009, Notice of Allowance, dated Jun. 30, 2014.
U.S. Appl. No. 12/580,923, filed Oct. 16, 2009, Final Office Action, dated Jul. 10, 2012.
"XMLTable" downloaded from the Internet Aug. 13, 2009 <http://download.oracle.com/docs/cd/B19306_01/server.102/b14200/ . . . > 3 pages.
"XMLSequence" downloaded from the Internet Aug. 13, 2009 <http://download.oracle.com/docs/cd/B19306_01/server.102/b14200/ . . . > 2 pages.
"Value" downloaded from the Internet Aug. 13, 2009 <http://download.oracle.com/docs/cd/B19306_01/server.102/B14200/ . . . >1 page.
"Extractvalue" downloaded from the Internet Aug. 13, 2009 <http://download.oracle.com/docs/cd/B19306_01/server.102/b14200/ . . . > p. 1.
"Extract (XML)"downloaded from the Internet Aug. 13, 2009 <http://download.oracle.com/docs/cd/B19306_01/server.102/b14200/ . . . > p. 1.
"5 Indexing XMLTypeData" downloaded from the Internet Aug. 12, 2009 <http://download.oracle.com/docs/cd/B28359_01/appdev.111/b28369 . . . > 29 pages.
"17 Using XQuery with Oracle XML DB", downloaded from the Internet Aug. 14, 2009 <http://download.oracle.com/docs/cd/B19306_01/appdev.102/b14259 . . . > 30 pages.

* cited by examiner

FIG. 2

```
create index SECURITY_INDEX on SECURITY(SDOC) indextype is xdb.xmlindex parameters(
202    XMLTable SECURITY_INDEX_TAB "/Security"
204       columns
206          Symbol varchar2(20) path "Symbol",
208          PE number path "PE",
210          Yield number path "Yield",
212          SecurityInformation xmltype path "SecurityInformation" virtual
214    XMLTable SECINFO_XTI_TAB "/SecurityInformation" passing SecurityInformation
          columns
             StockInformation xmltype path "*" virtual
216    XMLTable STOCKINFO_IDX_TAB "/*" passing StockInformation
          columns
             Sector varchar2(100) path "Sector");
```

FIG. 3

SECURITY_INDEX_TAB 302

| COLUMN NAME | DATA TYPE | DESCRIPTION |
| --- | --- | --- |
| Key | ROW(1000) | Primary key of index table |
| RID | ROWID | ROWID of the document in the base table |
| Symbol | VARCHAR2(20) | Store the content of "Symbol" |
| PE | NUMBER | Store the content of "PE" |
| Yield | NUMBER | Store the content of "Yield" |

SECINFO_XTI_TAB 304

| COLUMN NAME | DATA TYPE | DESCRIPTION |
| --- | --- | --- |
| Key | ROW(1000) | Primary key of index table |
| RID | ROWID | ROWID of the document in the base table |
| PKey | ROW(1000) | Key of the master table, foreign key to table SECURITY_INDEX_TAB(key) |

STOCKINFO_IDX_TAB 306

| COLUMN NAME | DATA TYPE | DESCRIPTION |
| --- | --- | --- |
| Key | ROW(1000) | Primary key of index table |
| RID | ROWID | ROWID of the document in the base table |
| PKey | ROW(1000) | Key of the master table, foreign key to table SECINFO_XTI_TAB(key) |
| Sector | VARCHAR2(100) | Store the content of "Sector" |

300

FIG. 5
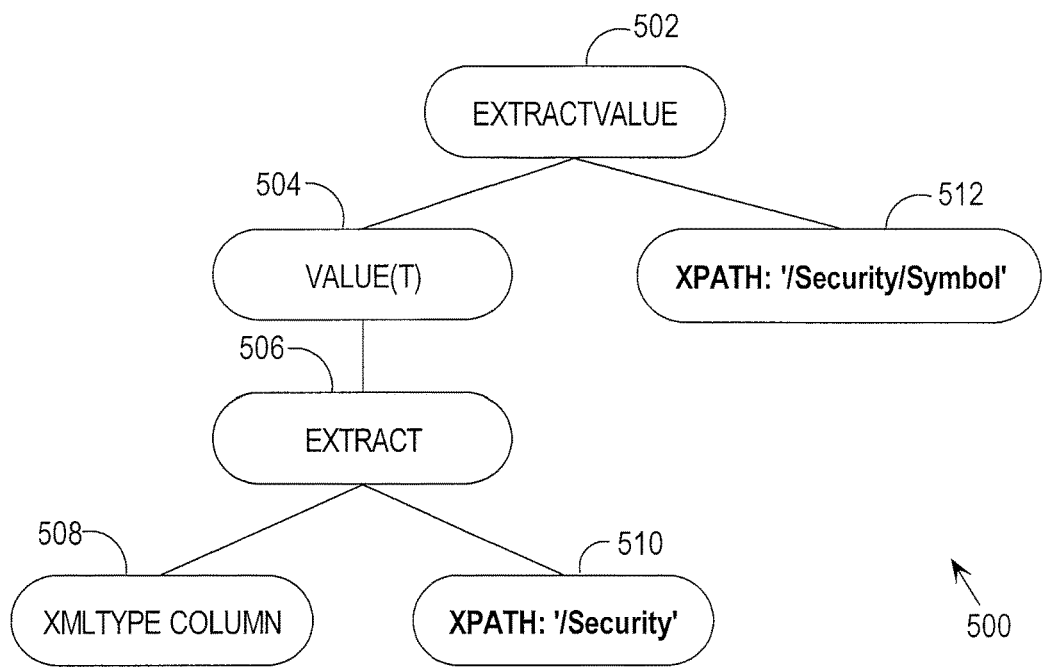
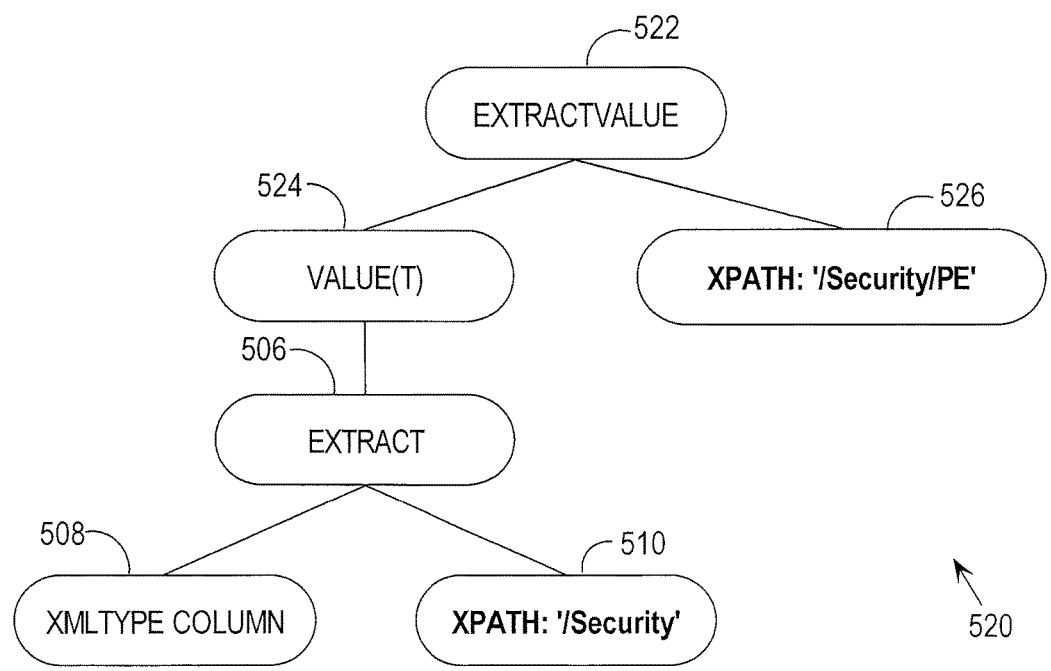

| | END PATH | CONTEXT | EFFECTIVE PATH |
|---|---|---|---|
| 602 | /b/c | /a/b | /a/b/c |
| 604 | /ns:b/ns:c | /ns:a/ns:b | /ns:a/ns:b/ns:c |
| 606 | /b/c | /a/* | /a/b/c |
| 608 | /*/c | /a/b | /a/b/c |
| 610 | /b/c | /a//b | /a//b/c |
| 612 | //b/c | /a/b | /a/b/c |
| 614 | /b[d]/c[e] | /a[p]/b | /a[p]/b[d]/c[e] |
| 616 | /b/c[e] | /a[p]/b[d] | /a[p]/b[d]/c[e] |

```
create index CUST_XTI on CUSTACC (cadoc)
indextype is xdb.xmlindex parameters('
    XMLTable CUST_INDEX_TAB "/Customer"
    columns
        Id number path "@id",
        Accounts xmltype path "Accounts/Account" virtual
    XMLTable ACCT_XTI_TAB "/Account" passing Accounts
    columns
        Acct_Id varchar2(30) path "@id" ');
```

700

```
create index ORD_XTI on ORDER_TAB (odoc)
indextype is xdb.xmlindex parameters('
    XMLTable ord_xti_tab "/FIXML/Order"
    columns
        Id varchar2(100) path "@ID",
        Acct varchar2(30) path "@Acct",
        side varchar2(20) path "@Side",
        OrdQty xmltype path "OrdQty" virtual
    XMLTable OrdQty_idx_tab "/OrdQty"
    columns
        Cash number path "@Cash'");
```

710

LEVERAGING STRUCTURED XML INDEX DATA FOR EVALUATING DATABASE QUERIES

CROSS-REFERENCE TO RELATED APPLICATIONS

This application claims the benefit as a Divisional of application Ser. No. 12/580,923, filed Oct. 16, 2009, titled "Leveraging Structured XML Index Data For Evaluating Database Queries", the entire contents of which is hereby incorporated by reference as if fully set forth herein, under 35 U.S.C. § 120. The applicant(s) hereby rescind any disclaimer of claim scope in the parent application or the prosecution history thereof and advise the USPTO that the claims in this application may be broader than any claim in the parent application.

This application is related to application Ser. No. 11/394,878, filed Mar. 31, 2006, titled "TECHNIQUES OF EFFICIENT XML META-DATA QUERY USING XML TABLE INDEX", the entire contents of which is hereby incorporated by reference as if fully set forth herein. This application is also related to application Ser. No. 12/014,238, filed Jan. 15, 2008, titled "MATCHING UP XML QUERY EXPRESSION FOR XML TABLE INDEX LOOKUP DURING QUERY REWRITE", hereinafter the "Matching Application", the entire contents of which is hereby incorporated by reference as if fully set forth herein.

FIELD OF THE INVENTION

The present invention relates to query optimization, and specifically to leveraging data in a structured XML index to optimize a query that refers to data in the index.

BACKGROUND

Relational database management systems, or "database systems", typically support a wide range of data types. For example, such a database system allows users to store and query scalar data type values such as integers, numbers, and strings. Some database systems also have the ability to support more complex data types. One particularly useful complex data type supported by some database systems is hierarchical Extensible Markup Language ("XML") data. Those database systems that include XML support allow users to define tables, or columns in a table, having an XML type.

XML data does not naturally lend itself to physical storage models that are conventional in database systems. A variety of storage techniques have been developed to manage the storage of XML data. For example, models for storing XML type data in a database system include storing the data object-relationally and storing the data in aggregate form.

Storing XML type data object-relationally involves defining a complex database representation for the XML data. In such a representation, various database objects are defined to represent and the components of the XML data. For example, each element of an XML document may be represented by a column in a table, and data from a given XML document is stored in a row of a table. XML elements may include text nodes, attributes, other kinds of nodes, and other values included in an XML document.

The underlying structures that comprise a database representation (e.g., tables, columns, etc.) are referred to as base database objects and structures, or simply database objects.

When an XML document is submitted to a database system for object-relational storage, the XML document is shredded into element values, which are stored in corresponding components of the base database structures. Thus, for example, to insert an XML-based document into an object relational table, a new row is created in the table for the document. The XML document is shredded into its various elements and each value from the shredded document is placed in the column of the table that corresponds to the value's element.

XML data that is stored object-relationally can be queried more efficiently through traditional query mechanisms. However, shredding XML data into component elements may be time consuming. Furthermore, if a particular set of XML data does not conform to a schema, or has a lot of variation among the component parts of the data, then storing the shredded XML data may require many database structures.

As an alternative, aggregate storage techniques may be used to store XML type data. In aggregate storage, unshredded XML data is stored in a large objects (LOBs), which include character-type large objects (CLOBs) and binary-type large objects (BLOBs). Aggregate storage is useful for storing complex data because such storage may be used to store data regardless of data format and/or the availability of a schema for the data. For instance, when adding an XML document to a LOB-based table, the document may be stored in a LOB as one large chunk of data, without performing any parsing or shredding of the data, and a reference to the location of the LOB for the XML document may be included in the table. Thus, tables using LOB-based storage to store complex data typically do not contain individual data values that have been extracted from the complex data.

Performing queries on data that is stored in aggregate form may be much more inefficient, time consuming, and resource intensive than performing queries on data stored using object-relational techniques. To simplify certain queries on XML data stored in aggregate form, a structured XML index may be defined to selectively store, in object-relational tables, extracted portions of XML data stored in LOBs. A structured XML index is an index that stores XML data in object-relational tables. The XML elements stored in a structured XML index may be tied to the LOB storing the source XML document through a location identifier for the XML table storing the LOB. Such a location identifier may be a physical row identifier, or a logical identifier of the location of the LOB in the base table, etc.

An example of a structured XML index is the XMLIndex developed by Oracle Corporation, described at download.oracle.com/docs/cd/B28359_01/appdev.111/b28369/xdb_indexing.htm, accessed Sep. 17, 2009, the contents of which are incorporated by reference as if fully set forth herein. While a structured XML index is described here in connection with XML data stored in aggregate form, a structured XML index may be used with many different kinds of data.

XML elements that are indexed through a structured XML index may be accessed at a much lower cost than accessing XML elements stored in the aggregate storage. Therefore, a query optimizer may rewrite a query on XML data that is stored in aggregate form to leverage those elements of the XML data that are stored in a structured XML index.

Path expressions, such as XPath expressions and XQuery expressions, may be used to identify particular elements of XML data. XPath is a method of identifying XML elements in a hierarchical XML structure. XPath operates on the abstract, logical structure of an XML document, rather than its surface syntax, to identify nodes in an XML document. XPath gets its name from its use of a path notation for navigating through the hierarchical structure of an XML document. XPath models an XML document as a tree of nodes. There are different types of nodes, including element nodes, attribute nodes and text nodes. The XPath data model is described in detail in Section 5 ("Data Model") of "XML Path Language (XPath)" (version 1.0), a W3C (World Wide Web Consortium) Recommendation dated 16 Nov. 1999, which is incorporated by reference as if fully set forth herein.

XQuery is the W3C language designed for querying XML data. It is similar to SQL in many ways, but just as SQL is designed for querying structured, relational data, XQuery is designed especially for querying semi-structured, XML data from a variety of data sources. The XQuery language is described on the W3C website, visited Sep. 12, 2009, at www.w3.org/WL/Query, which is incorporated by reference as if fully set forth herein.

As described in the Matching Application referred to above, multiple techniques may be used for determining whether a structured XML index may be used when executing an XML query. One such technique includes generating one or more index definition path expressions by concatenating a row pattern expression and a column pattern expression of an structured XML index. An index definition path expression (referred to herein as an "index expression") may be generated for each column pattern expression. For ease of illustration, an index expression is described as derived from the definition of a structured index. A path expression in an XML query (referred to herein as a "query expression") is then compared to one or more of the index expressions. If the query expression matches an index expression, then the structured XML index may be used to process the XML query.

In another technique, a determination is made as to whether an expression associated with a structured XML index is semantically equivalent to an expression of an XML query even though the expressions are not the same. Such expressions may include variable expressions, value expressions, constructor expressions, and/or path expressions.

In another technique, a determination is made as to whether the row pattern expression of a structured XML index "contains" a query expression of an XML query. An example of containment is when a query expression includes a predicate that is not part of the row pattern expression.

Index expressions that "match" query expressions, as described above, are referred to herein as "directly matching" the query expressions. Traditionally, a query optimizer only utilizes a structured XML index in a particular query if a query expression from the query directly matches an index expression for the index. Therefore, many queries that involve XML elements that are indexed in a structured XML index, but are not referred to using path expression that directly match index expressions used to define the index, are not evaluated using the XML index. It would be beneficial to use the structured XML index in queries that do not include query expressions that directly match index expressions, but still refer to XML elements stored in the index.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 illustrates an example SQL statement that is configured to create a structured XML index on a column of a database table that stores XML data.

FIG. 3 illustrates example structures of the XMLTables that result when the SQL statement in FIG. 2 is run.

FIG. 5 illustrates operator trees to show input source analysis for operators from a particular query.

FIG. 7 illustrates example database statements that create structured XML indexes on columns of database tables that store XML data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In one embodiment of the invention, a query may be rewritten to leverage information stored in a structured XML index. An operator in the query may be analyzed to determine an input source database object for the operator by traversing an operator tree rooted at the operator. The path expressions associated with the operator tree may be fused together to form an effective path expression for the operator. A database system may then determine whether the effective path expression is a direct match to a path expression derived from the definition of a structured index. If the effective path expression directly matches a path expression for the structured index, the query may be rewritten using references to the structured index to obtain the data to which the effective path expression refers.

As a further aspect of the invention, operators in a query that have effective paths that refer to data in the same index table may be grouped together. A single subquery may be written for a group of operators to minimize the number of times the index table is scanned to evaluate the query.

Also, a structured XML index may be used as an implied schema for the indexed XML data. This implied schema may be used to optimize queries that refer to the indexed XML data.

Example XML Index

An XML document may be stored as a LOB in a column of a database table structure, such as an XMLType column. While XMLType is referred to herein as one example of a database data type used for identifying XML data, other data types for identifying XML data may be used within the embodiments of the invention.

Figure 1:
FIG. 1 illustrates an example row of XML data in a column of a database table that stores XML data.

To illustrate a database table with XML data, the SQL Statement "create table SECURITY (SDOC xmltype);" may be run in a database system to create a table named SECURITY with an XMLType column named SDOC. An example document from a row of the resulting SECURITY table is illustrated by XML 100 of FIG. 1. XML 100 may be stored in a single LOB, a reference to which may be stored in the SDOC column of the SECURITY table.

A user of the database system managing the SECURITY table may create one or more structured XML indexes on the information in the SECURITY table. An example SQL statement 200 illustrated in FIG. 2 is configured to create a structured XML index named SECURITY_INDEX, which includes several chained XMLTables that contain information from the SDOC column of the SECURITY table. As such, statement 200 refers to the Symbol node 104, PE node 122, Yield node 124, and Sector node 110 in the SECURITY table to index.

Index definition path expressions, or index expressions, may be determined for the information indexed in SECURITY_INDEX by concatenating row pattern expressions and column pattern expressions in the definition of the index. Statement 200 specifies a row pattern expression in connection with the first XML Table statement 202 (i.e., "/Security") and multiple column expressions associated with the same XML Table statement 202 at statements 206-212 (i.e., "Symbol", "PE", "Yield", and "SecurityInformation"). Thus, the following index expressions may be determined for SECURITY_INDEX: '/Security/Symbol', '/Security/PE', '/Security/Yield', and '/Security/SecurityInformation'. These index expressions correspond to the XML nodes that are direct children of the Security node 102 illustrated in XML 100 of FIG. 1, i.e., Symbol node 104, PE node 122, Yield node 124, and SecurityInformation node 106.

In the index resulting from statement 200, the columns created for "Symbol", "PE", and "Yield" are of native data types varchar and number because Symbol node 104, PE node 122, and Yield node 124 each contain only a single respective text node. The database system can extract the scalar information contained in these text nodes from the LOB for each XML document in SDOC and store the scalar information in columns of SECURITY_INDEX_TAB.

The column for "SecurityInformation" is of an XMLType data type because SecurityInformation node 106 is a wrapper, and does not contain a scalar value. Thus, a second-level index table named SECINFO_XTI_TAB is created in statement 214, which includes an XMLType column for "StockInformation" that corresponds to the child node 108 of SecurityInformation node 106. This column is also of data type XMLType because StockInformation node 108 is also a wrapper, and does not contain a scalar value. Thus, a third-level XML Table named STOCKINFO_IDX_TAB is created at statement 216 with a column corresponding to scalar Sector node 110.

Because of the chained XMLTables in SECURITY_INDEX, a further index expression may be determined for the index. Specifically, the column patterns in each of the chained tables may be concatenated to form an index expression for the information in the last chained table, i.e., '/Security/SecurityInformation/StockInformation/Sector'. This index expression corresponds to the Sector node 110 illustrated in XML 100 of FIG. 1.

To evaluate statement 200, the database system extracts the identified information from the LOB for each of the rows in SECURITY, and saves the extracted information in the index tables of the SECURITY_INDEX structured XML index. FIG. 3 illustrates example structures of the XMLTables that result when statement 200 is run, i.e., SECURITY_INDEX_TAB table 302, SECINFO_XTI_TAB table 304, and STOCKINFO_IDX_TAB table 306.

As illustrated above, not all of the information in the SDOC column of SECURITY is shredded into the index. A user may choose to include in an index only information from those XML nodes that will be searched frequently. The XML information that is not included in the index is accessible through the SECURITY table, albeit in a format that is more costly to search than an index.

Rewriting a Query to Leverage a Structured Xml Index

As described above, the SECURITY_INDEX that is created by running statement 200 includes the following index expressions: '/Security/Symbol'; '/Security/PE'; '/Security/Yield'; and '/Security/SecurityInformation/StockInformation/Sector'. Thus, if a query includes a path expression that directly matches one of these path expressions, a database system can leverage SECURITY_INDEX to evaluate the query.

However, not all queries that refer to XML values that are included in a structured XML index refer to these values with path expression that directly matches an index expression of the index. According to the embodiments of the invention, such queries may be rewritten to leverage indexes keyed to the XML nodes referred to in the queries. Thus, in one embodiment of the invention, queries are analyzed to determine those path expressions, including XPath expressions and XQuery expressions, that indirectly refer to nodes included in an index.

Figure 4:
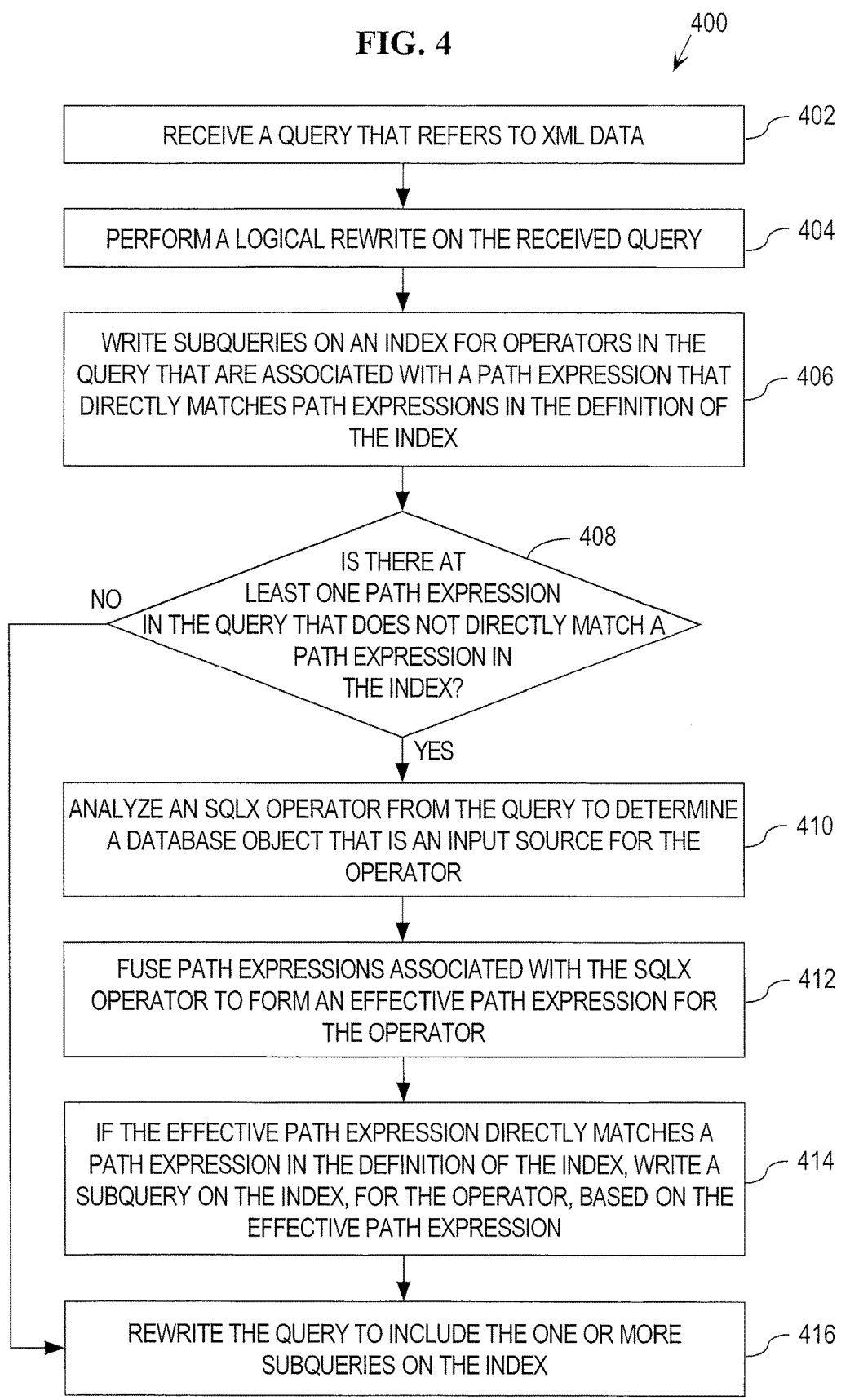
FIG. 4 illustrates an example method of rewriting a query to leverage the information in a structured XML index.

FIG. 4 illustrates an example method 400 of rewriting a query to leverage the information in a structured XML index. One or more of the steps of FIG. 4 may be excluded from embodiments of the inventions. At step 402, a query is received that refers to XML data. For example, a database system receives a request to evaluate the following example query Q1:

| Q1 | SELECT count(*) from SECURITY p WHERE extractValue(p.SDOC, '/Security/PE') = 25; |

Query Q1 refers to XML data by using an extractValue operator on the SDOC column of the SECURITY table.

At step 404, a logical rewrite is performed on the received query. A logical rewrite includes (a) rewriting a query to include SQLX operators, and (b) normalizing path expressions in the query to remove predicates from the expressions. In one embodiment of the invention, logical rewrites are used to transform XQuery expressions into XPath expressions. XQuery expressions may be included in operators such as XMLTable, XMLQuery, and XMLExists, etc. A database system may also logically rewrite other constructs in a query within the embodiments of the invention.

SQLX operators are SQL operators that take, as parameters, an input source, such as an XMLType column of a database table, and one or more path expressions. Examples of SQLX operators include extract, extractValue, XMLSequence, existsNode, etc. In one embodiment of the invention, an SQLX operator only takes XPath-type path expressions as parameters.

An example of a logical rewrite is described in further detail at download.oracle.com/docs/cd/B19306_01/app-dev.102/b14259/xdb_xquery.htm#sthref167 6, the contents of which are incorporated by reference, as if fully set forth herein. Logically rewriting a query may not be required within the embodiments of the invention. For example, in query Q1, no references to XML data require a logical rewrite. Specifically, Q1 includes one reference to XML data, i.e., "extractValue(p.SDOC, '/Security/PE')". This reference to XML data is already written using the SQLX operator "extractValue", and has no XQuery expressions. Therefore, no logical rewrite is needed for query Q1.

At step 406, subqueries on an index are written for operators in the query that are associated with a path expression that directly matches path expressions derived from the definition of an index. In one embodiment of the invention, the index is a structured XML index. For example, the "extractValue" operator of query Q1 includes the path expression '/Security/PE', which is evaluated over the SDOC column of the SECURITY table. The definition of SECURITY_INDEX is also associated with the index expression '/Security/PE' originating from the SDOC column of the SECURITY table. Therefore, the path expression in query Q1 directly matches a path expression derived from the definition of SECURITY_INDEX. As such, the database system writes a subquery on the appropriate index table of SECURITY_INDEX for the "extractValue" operator in Q1, as follows: "exists (select null from SECURITY_INDEX_TAB t where t.rid=p.rowid and t.PE=25)".

If other structured XML indexes are available, the database system also checks the index expressions for the other available indexes for matches. For ease of illustration, most examples herein are restricted to analysis of the SECURITY_INDEX.

At step 408, it is determined whether there is at least one path expression in the query that does not directly match a path expression in the index. For example, the database system determines that query Q1 includes only path expressions that are direct matches to index expressions of a structured XML index. Therefore, steps 410-414 are not performed for query Q1.

At step 416, the query is rewritten to include the one or more subqueries on the index. For example, a query optimizer in the database system may rewrite query Q1, prior to evaluating the query, as illustrated by the following query Q1':

```
Q1'  SELECT count(*) FROM SECURITY p
    WHERE exists(select null from SECURITY_INDEX_TAB t where t.rid =
    p.rowid and t.PE = 25);
```

A query optimizer may further modify a query that has been rewritten according to the embodiments of the invention, such as query Q1', before the query is evaluated. Query Q1' directly queries SECURITY_INDEX for the XML data referred to in Q1 instead of querying the SECURITY table for the XML data. Querying the SECURITY_INDEX for XML data is much faster than querying the SECURITY table for the same information.

Example method 400 is further described in the context of the following example query Q2:

```
Q2  SELECT extractValue(value(t), '/Security/Symbol') from SECURITY p,
    table(xmlsequence(extract(p.SDOC, '/Security'))) t
    WHERE extractValue(value(t), '/Security/PE') = 25;
```

At step 402, query Q2 is received by a database system. At step 404, the database system determines that a logical rewrite is not needed because all references to XML data in Q2 are written with SQLX operators and do not include XQuery expressions.

At step 406, the database system determines that none of the references to XML data in query Q2 are direct matches to path expressions derived from the definition of the available structured XML index, SECURITY_INDEX, because the information stored in SECURITY_INDEX is defined based on the SDOC column of the SECURITY table, and the "extractValue" statements of Q2 extract information from logical table t. Logical table t is a table defined in query Q2 itself. Thus, in the case of Q2, no path expressions are identified as direct matches and no subqueries are written at step 406.

At step 408, the database system determines that there is at least one path expression in query Q2 that does not directly match a path expression in the available index, SECURITY_INDEX, and therefore the database system performs steps 410-416.

At step 410, an SQLX operator from the query is analyzed to determine a database object that is an input source for the operator. In one embodiment of the invention, all SQLX operators that include path expressions as parameters are analyzed. However, for ease of illustration, the analysis of only certain SQLX operators are described.

The input source database object of the SQLX operator may be identified using a top-down operator tree traversing algorithm. If the input source of the SQLX operator is another SQLX operator, then the input source algorithm is recursively called on the nested operator. The search stops at an underlying database object, e.g., an XMLType column of a database table, which is the input source for the SQLX operator being analyzed.

For example, the database system analyzes SQLX operators in query Q2 to determine database object input sources for the SQLX operators. Operator trees 500 and 520 in FIG. 5 illustrate the analysis for operators in query Q2. Operator tree 500 illustrates the analysis for the "extractValue" (operator 502) in the select clause of Q2. Operator 502 has two parameters: "value(t)" and the XPath '/Security/Symbol', represented in operator tree 500 by operators 504 and 512, respectively. The "value(t)" operator 504 is associated with the table t that is defined in Q2, the source of which is "extract" operator 506. The "extract" operator 506 has, as parameters, the XMLType column 508, "p.SDOC", and XPath 510, '/Security'. Traversal of the operator tree for operator 502 stops upon finding a database object. Thus, XMLType column 508 is identified to be the database object that is the input source of the "extractValue" operator 502.

Operator tree 520 is created in a manner similar to operator tree 500, starting with the "extractValue" operator 522 in the where clause of Q2. Operator tree 520 shows that the input source for the "extractValue" operator 522 is also XMLType column 508 identified as a parameter of the extract operator 506.

An example function is described to find the underlying input source of a particular SQLX operator as follows:

```
Boolean AnalyzeOpn(InputOpt, OutputOptList)
{
  switch (type of InputOpt)
  {
    case Column:
      return;
    case XML Opt:
      if (InputOpt is extract)
        add InputOpt to the OutputOptList;
      AnalyzeOpn(InputOpt's ChildOpt, OutputOptList);
      break;
    case subquery:
      AnalyzeOpn(subquery's selectOpt, OutputOptList);
      ...
  }
}
```

According to the example function, the operator tree for a particular SQLX operator is traversed once until the source database object for the operator is reached. The "extract" operators, etc. along with the XPath expressions are inserted into the OutputOptList as the operator tree is traversed. The input source of a SQLX operator may be used to evaluate whether the effective path expression, described in more detail below, that is associated with the particular SQLX operator is a direct match with path expressions derived from the definition of a structured XML index.

At step 412, path expressions associated with the SQLX operator are fused to form an effective path expression for the operator. An effective path expression for an SQLX operator is constructed by concatenating all of the path expressions associated with the SQLX operator such that common contexts are not duplicated. For example, as illustrated in operator tree 500 (FIG. 5), operator 502 has associated therewith two path expressions: '/Security' (XPath 510) and '/Security/Symbol' (XPath 512). Because XPath 510 is the context for XPath 512, it is said that XPath 512 operates over XPath 510, and the information in XPath 510 will precede the information in XPath 512 in the effective path expression for the "extractValue" operator 502.

In order to compose an effective path expression from the two path expressions associated with operator 502, the database system determines the common context between the two path expressions. The common context between XPath 510 and XPath 512 is '/Security'. Thus, XPaths 510 and 512 are concatenated without duplicating the common context, as follows: '/Security'+'/Security/Symbol'='/Security/Symbol'. If any other path expressions were associated with operator 502, these path expressions would be concatenated with XPath 510 and XPath 512 using the same technique.

The context of the effective path is determined based on the context of the deepest XPath in the operator tree. Therefore, the effective path for the "extractValue" operator 502 is evaluated over the SDOC column of the SECURITY table, as indicated by XMLType column 508.

Similarly, XPaths 510 and 526 may be concatenated to form the effective path for operator 522, '/Security/PE', which is evaluated over the SDOC column of the SECURITY table. An effective path expression may be constructed from fusing any number of path expressions associated with a particular SQLX operator within the embodiments of the invention.

Figure 6:
FIG. 6 illustrates a table of effective path patterns resulting from concatenating various patterns of path expressions.

FIG. 6 illustrates a table 600 of effective paths resulting from concatenating various patterns of path expressions. For example, at row 602, to concatenate '/b/c' with '/a./b', where '/b/c' operates over '/a/b', the common context is determined: '/b'. With the context path expression information preceding the end path expression information, and without duplicating the common context, the effective path for row 602 is '/a/b/c'. To clarify notation, in row 604, "ns" is a namespace for the segments of the path expressions, and "d", "e", and "p" are predicates in rows 614 and 616.

At step 414, a subquery on the index, for the operator, is written based on the effective path expression if the effective path expression directly matches a path expression derived from the definition of the index. For example, the effective paths determined for query Q2, i.e., '/Security/Symbol' and '/Security/PE', both evaluated over the SDOC column of the SECURITY table, directly match path expressions derived from the definition of the SECURITY_INDEX structured XML index. Thus, the SECURITY_INDEX may be leveraged in evaluating these effective paths.

The database system writes subqueries for the effective paths for operators 502 and 522 determined above. For example, for operator 502, the database system may write the following subquery: "select symbol from SECURITY_INDEX_TAB t where t.rid=p.rowid" with "p" as the alias for the SECURITY table. Also, for operator 522, the database system may write the following subquery: "select null from SECURITY_INDEX_TAB t where t.rid=p.rowid and t.pe=25" with "p" being the same alias.

At step 416, the query is rewritten to include the one or more subqueries on the index. For example, the database system wrote only the two subqueries on the SECURITY_INDEX index in connection with step 414. Therefore, to leverage the SECURITY_INDEX, the database system rewrites query Q2 using these subqueries, which include references to the SECURITY_INDEX, as shown in the following query Q2':

```
Q2' SELECT (select symbol from SECURITY_INDEX_TAB t where t.rid =
        p.rowid) from SECURITY p
    WHERE exists (select null from SECURITY_INDEX_TAB t where t.rid =
        p.rowid and t.pe = 25);
```

Steps 406, 414, and 416 may not be distinct actions within the embodiments of the invention.

Alternate Use Cases

Through the embodiments of the invention, many different kinds of queries may be rewritten to leverage structured XML indexes. To illustrate, example method 400 is applied herein with respect to other use cases. At step 402, a database system receives the following query Q3:

```
SELECT extractValue(extract(p.SDOC,'/Security'),'/
    Security[PE=25]/Symbol') FROM
        SECURITY p;                                                3
```

At step 404, the database system determines that the references to XML data in Q3 are associated with SQLX operators, and are not XQuery expressions. Therefore, no logical rewrite is needed for query Q3.

At step 406, it is determined that the references to XML data in Q3 are not direct matches to any of the path expressions in the SECURITY_INDEX structured XML index. Specifically, the "extractValue" operator in Q3 does not operate from the SECURITY table, but from the set of intermediate XMLType nodes returned by the "extract" operator. Therefore, the path expression in query Q3 does not match any path expressions in SECURITY_INDEX because SECURITY_INDEX does not reference the virtual table created by the "extract" operator. Therefore, no sub-queries are written at step 406.

At step 408, it is determined that one or more path expressions in Q3 are not direct matches to path expressions in the index, and control moves to step 410. At step 410, the SQLX operator "extractValue" is analyzed to determine an input source database object for the operator. Specifically, the database system determines that the input source for the "extractValue" operator is the SDOC column of the SECURITY table, determined as described above in connection with the operator trees of FIG. 5.

At step 412, the path expressions associated with the "extractValue" operator are fused to find an effective path expression for the operator. The paths '/Security' and '/Security[PE=25]/Symbol' are concatenated as follows: '/Security'+'/Security[PE=25]/Symbol'='/Security[PE=25]/Symbol' evaluated over the SDOC column of the SECURITY table.

At step 414, the effective path expression is compared to index expressions from the SECURITY_INDEX. Because the effective path involves predicate, i.e., "[PE=25]", the determination of whether '/Security[PE=25]/Symbol' directly matches a path expression derived from the definition of the SECURITY_INDEX involves determining whether both '/Security/Symbol' (explicit in the effective path) and '/Security/PE' (implied in the effective path) are both derivable from the index definition.

Because both of these path expressions are direct matches to index expressions of SECURITY_INDEX, a subquery is written to select the XML data conforming to the effective path, '/Security[PE=25]/Symbol', from SECURITY_INDEX_TAB. This subquery may be written as "select symbol from SECURITY_INDEX_TAB t where t.rid=p.rowid and t.PE=25". Thus, at step 416, query Q3 is rewritten as illustrated in the following query Q3':

```
SELECT (select symbol from SECURITY_IN-
    DEX_TAB t where t.rid=p.rowid and t.PE=25)
        FROM SECURITY p;                                           Q3'
```

As a further example, at step 402, the following query Q4 is received at a database system:

| Q4 | SELECT t.* from SECURITY p, XMLTable(for $s in /Security[PE = 25] return $s/Symbol/text( ) passing p.SDOC) t; |
|---|---|

At step 404, the database system determines that a logical rewrite is needed for query Q4 because the path expressions in Q4 are XQuery expressions. Thus, Q4 is rewritten as illustrated in query Q4', in which the XQuery statements of Q4 are rewritten as SQLX operators with XPath expressions:

```
Q4'  SELECT * from SECURITY p, (SELECT t."COLUMN_VALUE" FROM (
        SELECT value(q) "COLUMN_VALUE"
    FROM table(xmlsequence(
        (select xmlagg(extract("$s"."COLUMN_VALUE",
            'Security/Symbol/text( )' ))) "COLUMN_VALUE" FROM (
        SELECT value(p) "COLUMN_VALUE"
        FROM table(
            xmlsequence(extract(p.SDOC, '/Security')) b WHERE
            extractValue(extract(p.SDOC, '/Security'), '/Security/PE') = 25 "$s"
        )
    )) q
    )
) t);
```

At steps 406 and 408, the database system determines that the path expressions in query Q4' do not directly match any of the path expressions derived from the definition of SECURITY_INDEX. Thus, the method continues to step 410.

At step 410, the SQLX operators of query Q4' having path expressions as parameters are analyzed to determine input sources. The input source for "extract("$s"."COLUMN_VALUE", 'Security/Symbolitext( )')" is based on "xmlsequence(extract(p.SDOC, '/Security')) b", which is extracted from the SDOC column of the SECURITY table. The extractValue operator from "extractValue(extract(p.SDOC, '/Security'), '/Security/PE')" is extracted from the SDOC column of the SECURITY table.

At step 412, the path expressions associated with each of the SQLX operators are fused to form effective path expressions for each operator. Thus, the effective path expression for the first "extract" operator is '/Security/Symbol/text( )', and the effective path expression from the "extractValue" operator is '/Security/PE', both from the SDOC column of the SECURITY table.

At step 414, the effective path expressions for the first "extract" operator and for the "extractValue" operator are both direct matches to index expressions in SECURITY_INDEX. Therefore, a subquery for the "extract" operator may be written as follows: "select symbol from SECURITY_INDEX_TAB t where t.rid=p.rowid". Furthermore, because the "extractValue" operator is part of a WHERE clause, the subquery for the operator may be expressed as "s.PE=25 AND p.ROWID=s.RID" in the WHERE clause of the rewritten query, with "s" being an alias for the index table where the PE XML elements are stored in SECURITY_INDEX, i.e., SECURITY_INDEX_TAB.

At step 416, the database system rewrites query Q4' to incorporate the subqueries written for the SQLX operators, as illustrated in the following query Q4":

Q4"    SELECT (select symbol from SECURITY_INDEX_TAB t where t.rid = p.rowid)
       FROM SECURITY_INDEX_TAB s, SECURITY p
       WHERE s.PE=25 AND p.ROWID= s.RID As another example, a query that has a join between multiple database tables may be rewritten to leverage index tables that contain indexed information for the multiple database tables. For example, the following Query Q5 may be rewritten to leverage index tables containing information from the CUSTACC and ORDER_TAB database tables:

Q5   SELECT count(*)
     FROM CUSTACC, ORDER_TAB WHERE XMLEXISTS
       ($odoc/FIXML/Order[@Acct=$cadoc/Customer/Accounts/Account/@id]'
       PASSING cadoc AS "cadoc", odoc AS "odoc");

Query Q5 has a join between 'Order/@Acct' in an ORDER_TAB database table and 'Account/@id' in a CUSTACC database table.

According to the embodiments of the invention, the XQuery expressions in Query Q5 may be logically rewritten and normalized as illustrated in query Q5':

Q5'  SELECT count(*) FROM CUSTACC c, ORDER_TAB o
     WHERE EXISTS (
       SELECT NULL FROM (
         SELECT VALUE(x) acctId
         FROM TABLE(XMLSEQUENCE(EXTRACT(c.cdoc,
           '/Customer/Accounts/Accounti/@id'))) x
       )p
       WHERE extractValue( EXTRACT(o.odoc, '/FIXML/Order'), '/Order/@Acct')
         = p.acctId

);

FIG. 7 illustrates example database statements that create such index tables that store XML data from the CUSTACC and ORDER_TAB database tables. Statement 700 creates CUST_XTI, which is an index on the CUSTACC table, and statement 710 creates ORD_XTI, which is an index on the ORDER_TAB table. According to the embodiments of the invention, query Q5' may be rewritten to leverage these index tables as illustrated in query Q5":

Q5"   SELECT COUNT(*) FROM ACCT_XTI_TAB acct, CUST_INDEX_TAB cust,
          CUSTACC c, ORDER_TAB o
        WHERE c.ROWID=cust.RID AND ord.ACCT=acct.ACCT_ID AND
          c.ROWID=acct.RID AND o.ROWID=ord.RID

Grouping Operators to Minimize Index Scans

Prior to writing subqueries on an applicable structured XML index for the operators in a query, e.g., at step 414 of FIG. 4, SQLX operators of the query may be grouped to minimize the number of times a particular index table is scanned when the query is evaluated. One subquery may be written to incorporate all of the operators in a group, instead of writing a separate subquery for each operator in the group. For example, the following query Q6 is analyzed according to method 400:

```
Q6  SELECT count(*) FROM SECURITY
      WHERE XMLEXISTS ('$SDOC/Security[SecurityInformation/*/Sector=$sector and
        Yield>$yield and PE > 25]' PASSING SDOC AS "SDOC", cast ('Technology'
        as varchar(25)) as "sector", cast (2.1 as decimal) as "yield" );
```

Specifically, a database system receives query Q6 according to step 402 of method 400. At step 404, it is determined that Q6 requires a logical rewrite because Query Q6 contains XQuery expressions. Specifically, Q6 is rewritten as show in query Q6':

```
Q6'  SELECT count(*) FROM SECURITY t
       WHERE
         EXISTS (
           SELECT null FROM (
             SELECT value(x) "COLUMN_VALUE" FROM table(
             XMLSequence(EXTRACT(EXTRACT(t.SDOC, '/Security',),
               '/Security/SecurityInformation/*/Sector'))) x
           ) P
           WHERE extractValue(P."COLUMN_VALUE",'/sector')
             =CAST('Technology' AS varchar(25))
         )
         AND extractValue(EXTRACT(t.SDOC,'/Security'), '/Security/Yield') >
             CAST(2.1 AS decimal)
         AND extractValue(EXTRACT(t.SDOC,'/Security',),'/Security/PE')>25;
```

At step 406, the database system determines that Query Q6' does not include any direct matches to index expressions included in the SECURITY_INDEX. At step 408, the database system determines that not all path expressions in Q6' are direct matches to path expressions derived from the definition of SECURITY_INDEX, and therefore, method 400 continues to step 410.

At step 410, the SQLX operators in Q6' are analyzed to determine input source database objects for the operators, all of which have the same input source: the SDOC column of the SECURITY table.

At step 412, path expressions associated with each of the SQLX operators in query Q6', i.e., the "XMLSequence" operator and the three "extractValue" operators in the where clause of Q6', are fused to form an effective path expression for each operator as follows: '/Security/SecurityInformation/*/Sector', '/Security/SecurityInformation/*/Sector', '/Security/Yield', and '/Security/PE', respectively. As previously stated, each of these effective paths are evaluated over the SDOC column of the SECURITY table.

Figure 8:
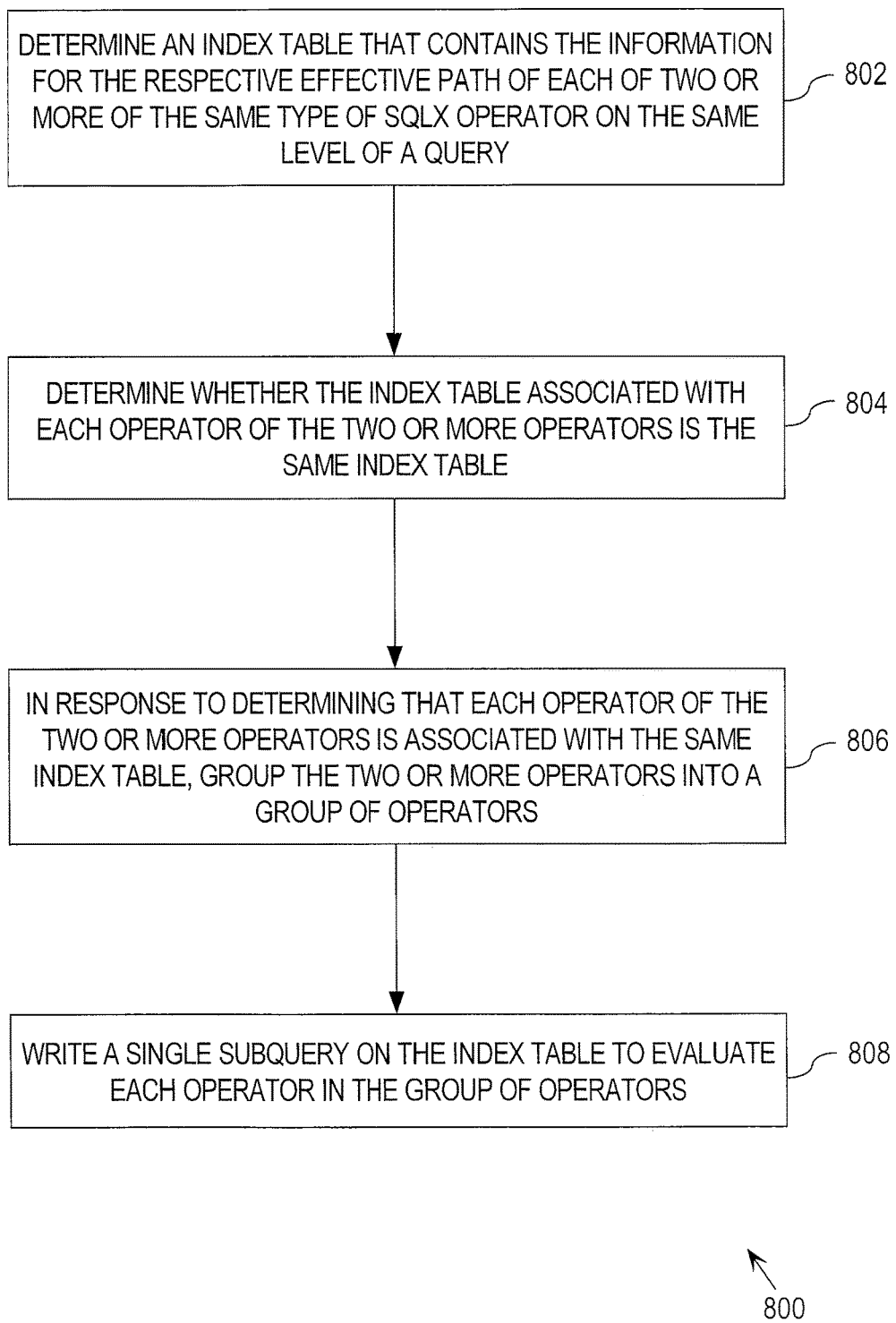
FIG. 8 illustrates an example method for grouping operators to minimize the number of times a particular index table is accessed.

According to one embodiment of the invention, prior to continuing to step 414, the database system may group the operators found in Q6'. FIG. 8 illustrates an example method 800 for grouping operators to minimize the number of times a particular index table is accessed according to one embodiment of the invention.

At step 802, an index table that contains the information for the respective effective paths of two or more of the same type of SQLX operator on the same level of a query are determined. In one embodiment of the invention, two or more of the same type of SQLX operator are the exact same class of operator, e.g., two or more "extractValue" operators. Also, two or more operators on the same level of a query are operators that are in the same context within the same clause of the query statement. For example, Q6' includes "extractValue(EXTRACT(t.SDOC, '/Security'), '/Security/Yield')>CAST(2.1 AS decimal)" and "extractValue(EXTRACT(t.SDOC, '/Security',), '/Security/PE')>25", which are the same type of operator and on the same level. Query Q6' does not include any other SQLX operators that are of the same type on the same level as another SQLX operator in the query.

Thus, at step 802, a database system determines the index table that contains information for each of these "extractValue" operators. As indicated above, the input source for both of these operators is the SDOC column of the SECURITY table, and the effective paths for these operators are '/Security/Yield', and '/Security/PE', respectively. The index table SECURITY_INDEX_TAB in SECURITY_INDEX contains XML data for both of these references.

At step 804, it is determined whether the index table associated with each operator of the two or more operators is the same index table. For example, the index tables containing information for the second and third "extractValue" operators in query Q6' discussed above is the same index table, SECURITY_INDEX_TAB.

At step 806, in response to determining that each operator of the two or more operators is associated with the same index table, the two or more operators are grouped into a group of operators. For example, the two "extractValue" operators that are on the same level in query Q6' are grouped together because each of the effective path expressions corresponding to the operators are found in the same index table.

At step 808, a single subquery on the index table is written to evaluate all of the operators in the group of operators. For example, a single subquery can be written for the second and third "extractValue" operators in query Q6', which were grouped together into a group at step 806, as follows: "select null from SECURITY_INDEX_TAB s WHERE s.YIELD>2.1 AND s.PE>25 AND p.ROWID=s.RID" where "p" is an alias for the SECURITY table.

In one embodiment of the invention, the SQLX operators that were not grouped into the above-mentioned group, i.e., the "XMLSequence" operator and the "extractValue" operator in the "EXISTS" function of query Q6', are written into separate subqueries using a structured index table if the corresponding effective paths are derived from the definition of the index, according to the example method 400 of FIG. 4.

Specifically, at step 414, it is determined that the effective path expression for the "XMLSequence" operator of query Q6', '/Security/SecurityInformation/*/Sector', directly matches a path expression derived from the definition of SECURITY_INDEX. Therefore, a subquery on SECURITY_INDEX is written for the operator, based on the effective path expression of the operator, as follows: "select sector from STOCKINFO_XTI_TAB st where st.rid=p.rowid)" where "p" is an alias for the SECURITY table.

Furthermore, at step 414, it is determined that the effective path expression for the "extractValue" operator in the "EXISTS" function of query Q6', '/Security/SecurityInformation/*/Sector', directly matches a path expression derived from the definition of SECURITY_INDEX. Therefore, a subquery on SECURITY_INDEX is written for the operator, based on the effective path expression for the operator, as follows: "exists(select null from STOCKINFO_XTI_TAB st where st.rid=p.rowid and st.sector='Techology')" where "p" is an alias for the SECURITY table.

At step 416, Query Q6' is rewritten to include the subqueries on SECURITY_INDEX as illustrated in the following query Q6":

```
Q6"    SELECT COUNT(*)
       FROM SECURITY_INDEX_TAB s, STOCKINFO_IDX_TAB st, SECURITY p
       WHERE st.SECTOR='Technology' AND p.ROWID=st.RID AND s.YIELD>2.1
           AND s.PE > 25 AND p.ROWID=s.RID
```

Because of the grouping described above, only one probe of the index table SECURITY_INDEX_TAB with Yield>2.1 and PE>25 as two column predicates on the index table were required to evaluate the query. If the grouping had not been done, the database system would have scanned SECURITY_INDEX_TAB twice.

In one embodiment of the invention, the steps of method 400 may be performed in an order that is different from the order described above. Furthermore, certain steps of method 400 may be performed multiple times for a particular query. For example, if a query includes an "XMLExists" operator, step 406 may be performed prior to step 404, as well as subsequent to step 404.

The Structural XML Index as an Implied Schema for the XML Data

A structured xml index may provide information on the structure of the XML data that is indexed in the index. In a structured XML index, a value that is represented in the index as relational column value is known as a scalar element, and a value that is projected out as xmltype column for chaining several index tables together is known as a collection element. A scalar element within a structured XML index indicates that the associated value occurs at most once in the XML structure, whereas a collection element in the index indicates that the value occurs more than once in the XML structure. A structured XML index provides this information because creation of the index fails if the underlying structure of the XML data does not match the structure of the index. Thus, a query on value that is shown to be scalar based on an associated structured XML index returns only one row per each document in the XML data. In one embodiment of the invention, an XML element shown to be scalar through an implied XML schema may be extracted from a table with only one row.

A query optimizer of a database system may use an implied schema based on the structure of a structured XML index to optimize a query on the associated XML structure, which may be particularly useful if no explicit schema is given for the XML data. For example, a database system receives a query that includes the statement "table(xmlsequence(extract(p.SDOC, '/Security/Symbol/text( )')))" where "p" is an alias for the SECURITY table. According to the SECURITY_INDEX_TAB table of the SECURITY_INDEX structured XML index, '/Security/Symbol' is a scalar value. The query optimizer of the database system may use this information to optimize away the "table (xmlsequence( ))" operators from the query, because these operators are only needed if the XML data returned from the "extract" function is non-scalar. Thus, according to one embodiment of the invention, the statement may be rewritten as follows: "extract(p.SDOC, '/Security/Symbol/text( )')".

The query optimizer may further rewrite the above statement according to established principles of SQL optimization as follows: "table (multicast (select extract(p.SDOC, '/Security/Symbol/text( )')))". The "extract" operator may be further rewritten according to the embodiments of the invention. For example, at step 406 of method 400, it is determined that the "extract" operator is associated with the path expression '/Security/Symbol' from the SDOC column of the SECURITY table. Thus, a subquery may be written for the "extract" operator as follows: "select symbol from SECURITY_INDEX_TAB t where t.rid=p.rowid)".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
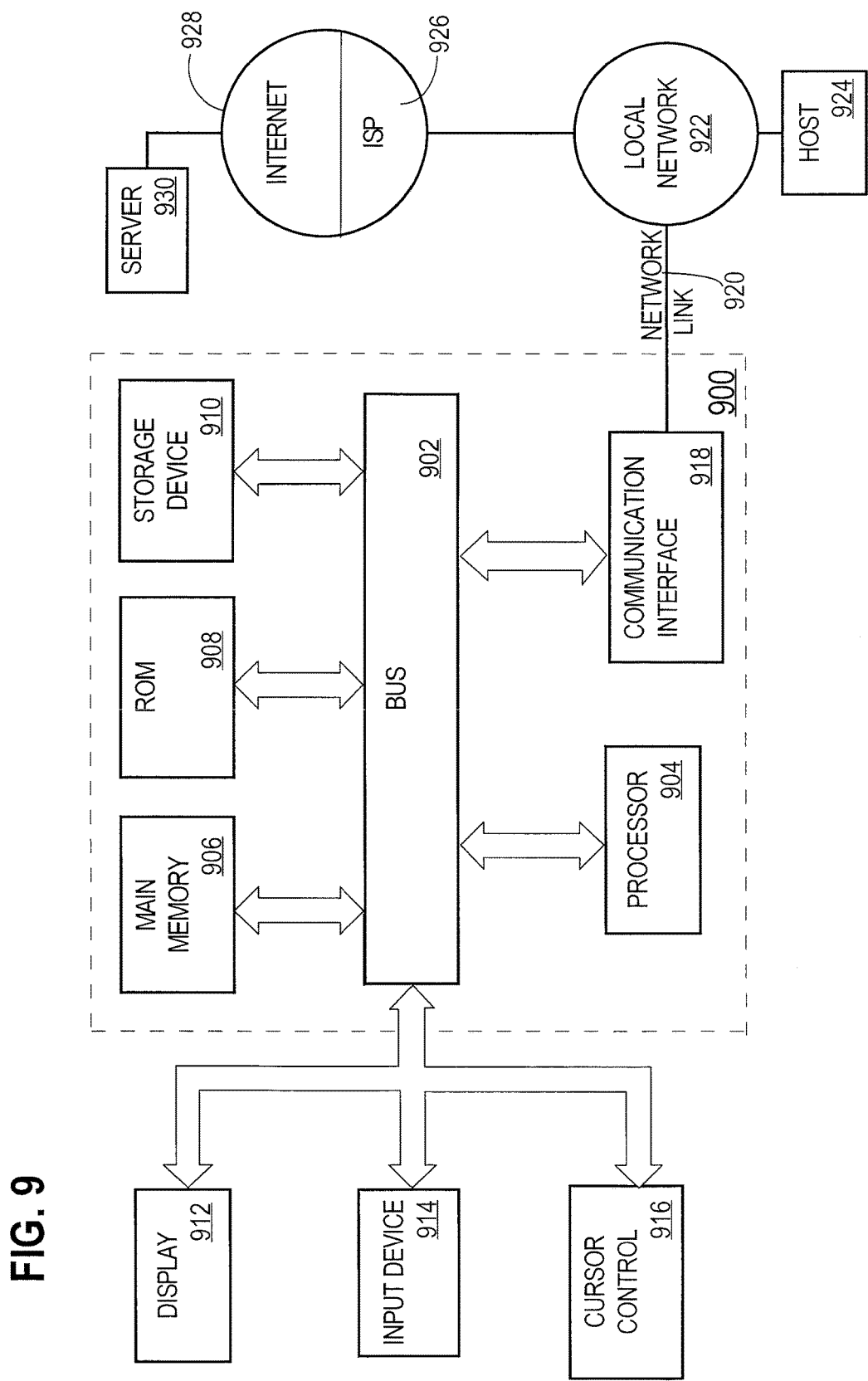
FIG. 9 is a block diagram of a computer system on which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-executed method comprising:
   identifying, in a particular query, a reference to an XML element that is indexed in a structured XML index;

wherein the particular query includes a portion that references a particular table other than the structured XML index;

wherein the structured XML index comprises a plurality of columns;

wherein each column, of the plurality of columns, is associated with a respective index definition path expression, said each column containing node values that are each within a respective document and are identified within the respective document by the respective index definition path expression of said each column;

determining whether the XML element is represented in the structured XML index as a scalar element;

based on determining that the XML element is represented in the structured XML index as a scalar element, identifying implied schema information indicating that the XML element is scalar; and rewriting the portion of the particular query that references the particular table based on the implied schema information to produce a rewritten portion of the particular query;

wherein the rewritten portion of the particular query references the particular table;

wherein the method is performed by one or more computing devices.

2. The computer-executed method of claim 1, wherein: the structured XML index indexes particular XML data; and the implied schema information for the XML element indicates that the XML element occurs at most once per document in the particular XML data.

3. The computer-executed method of claim 1, wherein the step of rewriting the particular query based on the implied schema information further comprises rewriting the particular query to extract the XML element from a table with only one row.

4. The computer-executed method of claim 1, wherein the step of rewriting the particular query based on the implied schema information further comprises removing, from the particular query, one or more operators used for non-scalar XML data.

5. The computer-executed method of claim 1, wherein rewriting the particular query based on the implied schema information comprises a query optimizer optimizing the particular query based on the implied schema information.

6. One or more non-transitory computer-readable media storing instructions which, when executed by one or more processors, cause:

identifying, in a particular query, a reference to an XML element that is indexed in a structured XML index;

wherein the particular query includes a portion that references a particular table other than the structured XML index;

wherein the structured XML index comprises a plurality of columns;

wherein each column, of the plurality of columns, is associated with a respective index definition path expression, said each column containing node values that are each within a respective document and are identified within the respective document by the respective index definition path expression of said each column;

determining whether the XML element is represented in the structured XML index as a scalar element;

based on determining that the XML element is represented in the structured XML index as a scalar element, identifying implied schema information indicating that the XML element is scalar; and rewriting the portion of the particular query that references the particular table based on the implied schema information to produce a rewritten portion of the particular query;

wherein the rewritten portion of the particular query references the particular table.

7. The one or more non-transitory computer-readable media of claim 6, wherein: the structured XML index indexes particular XML data; and the implied schema information for the XML element indicates that the XML element occurs at most once per document in the particular XML data.

8. The one or more non-transitory computer-readable media of claim 6, wherein instructions for rewriting the particular query based on the implied schema information further comprise instructions which, when executed by one or more processors, cause rewriting the particular query to extract the XML element from a table with only one row.

9. The one or more non-transitory computer-readable media of claim 6, wherein instructions for rewriting the particular query based on the implied schema information further comprise instructions which, when executed by one or more processors, cause removing, from the particular query, one or more operators used for non-scalar XML data.

10. The one or more non-transitory computer-readable media of claim 6, wherein instructions for rewriting the particular query based on the implied schema information further comprise instructions which, when executed by one or more processors, cause a query optimizer optimizing the particular query based on the implied schema information.

* * * * *

UNITED STATES PATENT AND TRADEMARK OFFICE
CERTIFICATE OF CORRECTION

PATENT NO. : 10,262,076 B2  
APPLICATION NO. : 14/513176  
DATED : April 16, 2019  
INVENTOR(S) : Chang et al.

Page 1 of 1

It is certified that error appears in the above-identified patent and that said Letters Patent is hereby corrected as shown below:

In the Specification

In Column 3, Line 17, delete "/WL/" and insert -- /XML/ --, therefor.

Signed and Sealed this  
Third Day of November, 2020

Andrei Iancu  
*Director of the United States Patent and Trademark Office*